United States Patent
Yamada (10) Patent No.: US 12,091,031 B2
(45) Date of Patent: Sep. 17, 2024

(54) CONTROL DEVICE AND CONTROL METHOD

(71) Applicant: Robert Bosch GmbH, Stuttgart (DE)

(72) Inventor: Yasuo Yamada, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 17/789,039

(22) PCT Filed: Dec. 2, 2020

(86) PCT No.: PCT/IB2020/061354
§ 371 (c)(1),
(2) Date: Jun. 24, 2022

(87) PCT Pub. No.: WO2021/130577
PCT Pub. Date: Jul. 1, 2021

(65) Prior Publication Data
US 2023/0040881 A1 Feb. 9, 2023

(30) Foreign Application Priority Data

Dec. 26, 2019 (JP) .................................. 2019-236390

(51) Int. Cl.
*B60W 50/14* (2020.01)
*B60W 50/00* (2006.01)

(52) U.S. Cl.
CPC ........ *B60W 50/14* (2013.01); *B60W 50/0097* (2013.01); *B60W 2300/36* (2013.01);
(Continued)

(58) Field of Classification Search
CPC ............ B60W 50/14; B60W 50/0097; B60W 2300/36; B60W 2554/4045; B60W 2554/4049; B60Y 2200/12
See application file for complete search history.

(56) References Cited

U.S. PATENT DOCUMENTS 8,520,695 B1 * 8/2013 Rubin .................. H04W 72/30
370/445
11,084,376 B2 * 8/2021 Matsuda ................ B62J 45/413
(Continued)

FOREIGN PATENT DOCUMENTS

EP 3098799 A1 11/2016
JP 2010086269 A * 4/2010
(Continued)

OTHER PUBLICATIONS

International Search Report and Written Opinion for Application No. PCT/IB2020/061354 dated Apr. 8, 2021 (11 pages).

*Primary Examiner* — Mohamed Barakat
(74) *Attorney, Agent, or Firm* — Michael Best & Friedrich LLP (57) ABSTRACT

The present invention is to obtain a control device and a control method capable of appropriately assisting driving of a straddle-type vehicle by a rider.
In a control device (12) and a control method of the present invention, an acquisition section of the control device (12) configured to control an operation of a straddle-type vehicle (10) acquires prediction information about a future lane change by a preceding vehicle that travels ahead of the straddle-type vehicle (10), and a control section of the control device (12) causes the straddle-type vehicle (10) to execute a safety operation (for example, causes a notification device (15) to issue a warning of the lane change to the rider), when the prediction information satisfies a determination criterion during a slipping-through traveling of the straddle-type vehicle (10).

12 Claims, 3 Drawing Sheets

(52) U.S. Cl.
CPC ............... *B60W 2554/4045* (2020.02); *B60W 2554/4049* (2020.02); *B60Y 2200/12* (2013.01)

(56) References Cited

U.S. PATENT DOCUMENTS

| | | | |
|---|---|---|---|
| 2012/0078498 A1* | 3/2012 | Iwasaki | B60W 10/20 |
| | | | 701/300 |
| 2015/0321699 A1 | 11/2015 | Rebhan et al. | |
| 2017/0169710 A1* | 6/2017 | Beaurepaire | G08G 1/163 |
| 2018/0037222 A1* | 2/2018 | Mahabadi | B60W 50/0097 |
| 2018/0164816 A1 | 6/2018 | Hashimoto et al. | |
| 2018/0326905 A1* | 11/2018 | Nakata | B60Q 9/008 |
| 2019/0279507 A1* | 9/2019 | Ishisaka | G08G 1/16 |
| 2020/0207346 A1* | 7/2020 | Tsuji | B60W 30/12 |

FOREIGN PATENT DOCUMENTS

| | | |
|---|---|---|
| JP | 2016177465 A | 10/2016 |
| JP | 2019073077 A | 5/2019 |
| JP | 2019099035 A | 6/2019 |
| WO | 2017154213 A1 | 9/2017 |
| WO | 2018096644 A1 | 5/2018 |
| WO | 2019111138 A1 | 6/2019 |

\* cited by examiner

CONTROL DEVICE AND CONTROL METHOD

BACKGROUND OF THE INVENTION

The present disclosure relates to a control device and a control method capable of appropriately assisting driving of a straddle-type vehicle by a rider.

A straddle-type vehicle such as a motorcycle has a higher degree of freedom of a traveling position in a width direction of a lane, as compared to a four-wheeled automobile and the like, because a vehicle width is narrow. Therefore, the straddle-type vehicle can perform slipping-through traveling (so-called, lane splitting) of traveling on or near a lane boundary delimiting lanes. Herein, during the slipping-through traveling, in order to avoid a collision with other vehicles, a necessity of appropriately assisting driving of the straddle-type vehicle by a rider increases. As technology of such driving assistance, for example, JP-A-2019-099035 discloses technology of setting a detection angle range of a front environment detection device wide, which is used in control of causing a motorcycle to execute an automatic deceleration operation, during the slipping-through traveling of the motorcycle.

SUMMARY OF THE INVENTION

In the technical field of the driving assistance of the straddle-type vehicle, it is preferably considered to assist more appropriately the driving of the straddle-type vehicle by the rider. For example, according to the technology disclosed in JP-A-2019-099035, the detection angle range of the front environment detection device is set wide during the slipping-through traveling of the motorcycle, so that it is possible to detect occurrence of a behavior of a preceding vehicle coming close to a pathway of the motorcycle in a wide range. As a result, it is possible to execute control for the driving assistance at an early timing. Herein, it is preferably considered to assist more appropriately the driving of the straddle-type vehicle by the rider during the slipping-through traveling.

The present invention has been made in view of the above situations, and an object thereof is to obtain a control device and a control method capable of appropriately assisting driving of a straddle-type vehicle by a rider.

Solution to Problem

A control device of the present invention is a control device configured to control an operation of a notification device configured to issue a notification to a rider of a straddle-type vehicle. The control device includes an acquisition section configured to acquire prediction information about a future lane change by a preceding vehicle that travels ahead of the straddle-type vehicle; and a control section that, when the prediction information satisfies a determination criterion during a slipping-through traveling of the straddle-type vehicle, causes the notification device to issue a warning of the lane change to the rider.

A control method of the present invention is a control method of a notification device configured to issue a notification to a rider of a straddle-type vehicle, wherein an acquisition section of a control device is configured to acquire prediction information about a future lane change by a preceding vehicle that travels ahead of the straddle-type vehicle, and wherein a control section of the control device causes the notification device to issue a warning of the lane change to the rider when the prediction information satisfies a determination criterion during a slipping-through traveling of the straddle-type vehicle.

A control device of the present invention is a control device configured to control an operation of a straddle-type vehicle. The control device includes an acquisition section configured to acquire prediction information about a future lane change by a preceding vehicle that travels ahead of the straddle-type vehicle; and a control section that, when the prediction information satisfies a determination criterion during a slipping-through traveling of the straddle-type vehicle, causes the straddle-type vehicle to execute a safety operation.

A control method of the present invention is a control method of a straddle-type vehicle, wherein an acquisition section of a control device is configured to acquire prediction information about a future lane change by a preceding vehicle that travels ahead of the straddle-type vehicle, and wherein a control section of the control device causes the straddle-type vehicle to execute a safety operation when the prediction information satisfies a determination criterion during a slipping-through traveling of the straddle-type vehicle.

Advantageous Effects of Invention

According to the control device and the control method of the present invention, the acquisition section of the control device configured to control the operation of the straddle-type vehicle acquires the prediction information about the future lane change by the preceding vehicle that travels ahead of the straddle-type vehicle, and the control section of the control device causes the straddle-type vehicle to execute the safety operation (for example, causes the notification device to issue a warning of the lane change to the rider), when the prediction information satisfies the determination criterion during the slipping-through traveling of the straddle-type vehicle. Thereby, upon the slipping-through traveling of the straddle-type vehicle, it is possible to cause the straddle-type vehicle to execute the safety operation (for example, the warning of the lane change to the rider) at an earlier timing, as compared to a case where the safety operation is executed, in response to occurrence of a behavior of the preceding vehicle coming close to a pathway of a motorcycle. Therefore, it is possible to appropriately assist the driving of the straddle-type vehicle by the rider.

DETAILED DESCRIPTION

Hereinafter, the control device of the present invention will be described using the drawings.

In the below, a control device that is used for a two-wheeled motorcycle is described. However, the control device of the present invention can also be used for a straddle-type vehicle (for example, a three-wheeled motorcycle, a four-wheeled buggy car, a bicycle and the like) other than the two-wheeled motorcycle. Note that, the straddle-type vehicle means a vehicle on which a rider straddles and rides, and includes a scooter and the like.

In the below, a case where an engine (specifically, an engine 13 in FIG. 1 described later) as a drive source capable of outputting power for driving wheels of the motorcycle is mounted is described. However, as the drive source of the motorcycle, another drive source (for example, a motor) other than the engine may also be mounted or a plurality of drive sources may also be mounted.

In the below, a case where a device (specifically, a notification device 15 in FIG. 1 described later) having a sound output function and a display function is used as a notification device for issuing a notification to the rider is also described. However, as the notification device, another notification device (for example, a device having only a sound output function, a device having only a display function or a device having a vibration generation function, etc.) may also be used or a plurality of notification devices may also be used. In addition, for example, instantaneous braking using a brake system (for example, a system including a hydraulic pressure control unit 14 in FIG. 1 described later), a drive source (for example, the engine 13 in FIG. 1 described later) and the like may be used as a warning to the rider. In this case, the brake system, the drive source and the like correspond to the notification device.

The configurations, the operations and the like to be described later are exemplary, and the control device and the control method of the present invention are not limited to the configurations, the operations and the like.

In the below, the same or similar descriptions are simplified or omitted as appropriate. In the respective drawings, for the same or similar members or parts, the reference signs thereof are omitted or the same reference signs are used. Also, for the detailed structures, the illustrations thereof are simplified or omitted as appropriate.

<Configuration of Motorcycle>

A configuration of a motorcycle 10 to which a control device 12 of the embodiment of the present invention is mounted is described with reference to FIGS. 1 and 2.

Figure 1:
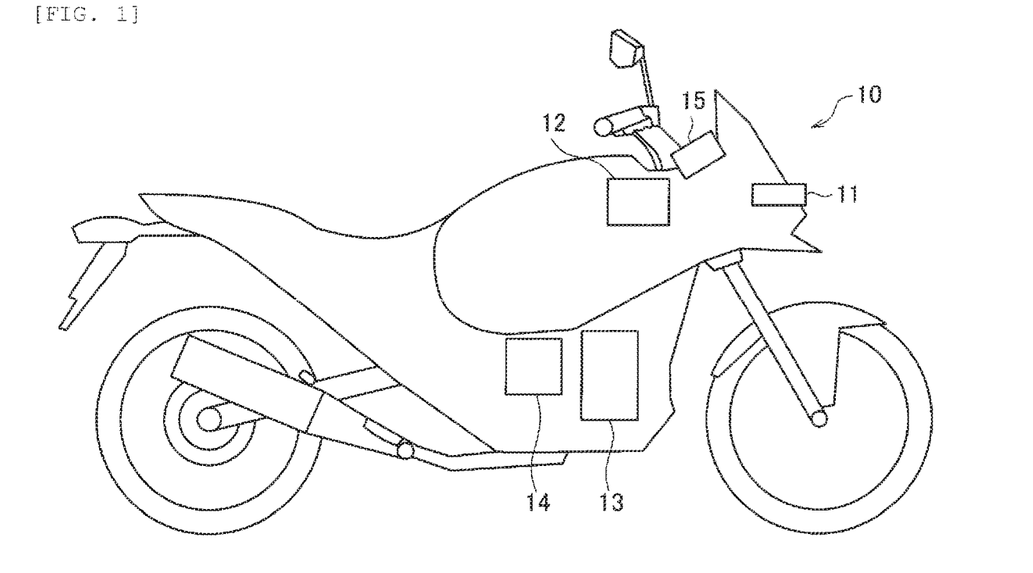
FIG. 1 is a pictorial view depicting a schematic configuration of a motorcycle to which a control device in accordance with an embodiment of the present invention is mounted.

FIG. 1 is a pictorial view depicting a schematic configuration of the motorcycle 10 to which the control device 12 is mounted. As shown in FIG. 1, the motorcycle 10 includes an environment sensor 11, the control device 12, the engine 13, the hydraulic pressure control unit 14, and the notification device 15.

The engine 13 corresponds to an example of the drive source of the motorcycle 10, and can output power for driving wheels. For example, the engine 13 is provided with one or a plurality of cylinders in which a combustion chamber is formed, a fuel injection valve configured to inject fuel toward the combustion chamber, and an ignition plug. The fuel is injected from the fuel injection valve, so that a fuel-air mixture including air and fuel is formed in the combustion chamber and the fuel-air mixture is ignited and combusted by the ignition plug. Thereby, a piston provided in the cylinder reciprocally moves and a crankshaft rotates. An intake pipe of the engine 13 is also provided with a throttle valve, and an intake volume to the combustion chamber changes according to a throttle opening that is a degree of opening of the throttle valve.

The hydraulic pressure control unit 14 is a unit having a function of controlling a braking force that is generated for the wheels. For example, the hydraulic pressure control unit 14 is provided on an oil passage for connecting a master cylinder and a wheel cylinder each other, and includes components (for example, a control valve and a pump) for controlling a brake hydraulic pressure of the wheel cylinder. Operations of the components of the hydraulic pressure control unit 14 are controlled, so that the braking force to be generated for the wheels is controlled. Note that, the hydraulic pressure control unit 14 may be configured to control each of the braking forces that are generated for both a front wheel and a rear wheel, or may be configured to control only the braking force that is generated for one of the front wheel and the rear wheel. The notification device 15 is configured to issue a notification to the rider. The notification device 15 has a sound output function and a display function. The sound output function is a function of outputting sound, and is implemented by a speaker, for example. The display function is a function of visually displaying information, and is implemented by a liquid crystal monitor or a lamp, etc., for example.

The environment sensor 11 is provided on a front part of a body of the motorcycle 10, and is configured to detect information about a surrounding environment of the motorcycle 10 (specifically, an environment ahead of the motorcycle 10). As the environment sensor 11, for example, a camera configured to capture an image of the front of the motorcycle 10 and a radar capable of detecting a relative position of a front target with respect to the motorcycle 10 are used. By using an image captured by the camera and a detection result of the radar, the information about the surrounding environment is detected.

Note that, the configuration of the environment sensor 11 is not limited to the above example. For example, in the environment sensor 11, the radar may also be replaced with a LIDAR (Laser Imaging Detection and Ranging). Also, for example, the environment sensor 11 may include a plurality of cameras, and image recognition and detection of the relative position may be performed based on outputs of the cameras.

The control device 12 is configured to control operations of the motorcycle 10.

For example, some or all of the control device 12 is configured by a microcomputer, a microprocessor unit and the like. For example, some or all of the control device 12 may also be configured so that firmware and the like can be updated, or may be a program module and the like that are executed by a command from a CPU and the like. The control device 12 may be one or may be divided into a plurality of control devices, for example.

Figure 2:
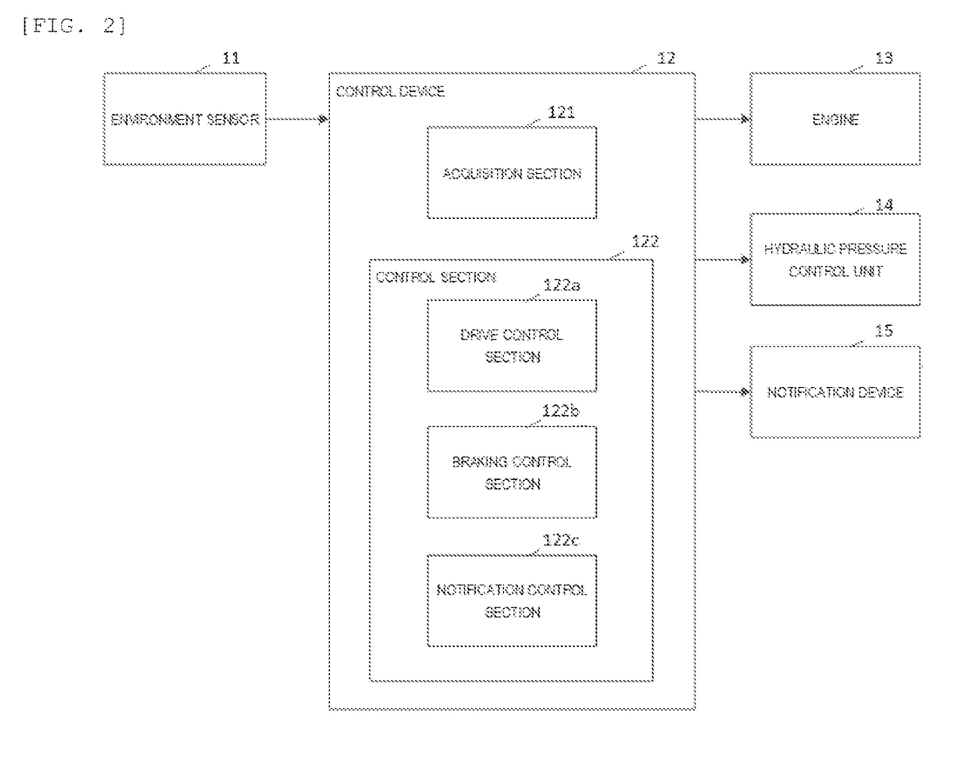
FIG. 2 is a block diagram depicting an example of a functional configuration of the control device in accordance with the embodiment of the present invention.

FIG. 2 is a block diagram depicting an example of a functional configuration of the control device 12. As shown in FIG. 2, the control device 12 includes, for example, an acquisition section 121, and a control section 122. The control device 12 is also configured to communicate with each device in the motorcycle 10 (for example, the environment sensor 11, the engine 13, the hydraulic pressure control unit 14 and the notification device 15).

The acquisition section 121 is configured to acquire a variety of information that is used in processing to be executed by the control section 122, and to output the information to the control section 122. For example, the acquisition section 121 may also acquire the variety of information, based on an output of the environment sensor 11. Also, for example, the motorcycle 10 may be provided with a communication device capable of communicating with a device outside of the motorcycle 10, and the acquisition section 121 may acquire the variety of information by performing wireless communication between the motorcycle 10 and other vehicles or infrastructure equipment by using the communication device.

Specifically, the acquisition section 121 is configured to acquire traveling position information that is used in determination processing (which will be described later) of determining whether the motorcycle 10 is under slipping-through traveling. The traveling position information is information indicative of a traveling position of the motorcycle 10 in a width direction of a lane. The acquisition section 121 is also configured to acquire prediction information that is used in determination processing, which will be described later, (specifically, determination processing of determining whether the prediction information satisfies a determination criterion) of determining whether a future lane change by a preceding vehicle that travels ahead of the motorcycle 10 is predicted or not. The prediction information is information about the future lane change by the preceding vehicle.

The control section 122 includes, for example, a drive control section 122*a*, a braking control section 122*b*, and a notification control section 122*c*, which are configured to function in cooperation with a program.

The drive control section 122*a* is configured to control operations of each device of the engine 13 (for example, the throttle valve, the fuel injection valve, the ignition plug and the like). Thereby, a drive force that is transmitted from the engine 13 to the wheels of the motorcycle 10 is controlled, so that acceleration of the motorcycle 10 is controlled.

The braking control section 122*b* is configured to control operations of each device of the hydraulic pressure control unit 14 (for example, the control valve, the pump and the like). Thereby, the braking force that is generated for the wheels of the motorcycle 10 is controlled, so that the deceleration of the motorcycle 10 is controlled.

The notification control section 122*c* is configured to control an operation of the notification device 15. Thereby, a timing at which a notification is issued to the rider and a content of the notification are controlled.

Herein, a traveling mode of the motorcycle 10 is configured to be switchable between a usual traveling mode and a cruise control mode. The usual traveling mode is a traveling mode in which the acceleration/deceleration of the motorcycle 10 is controlled according to acceleration/deceleration operations by the rider (i.e., an accelerator operation and a brake operation). On the other hand, the cruise control mode is a traveling mode in which a cruise control is executed and the acceleration/deceleration of the motorcycle 10 is thus automatically controlled irrespective of the acceleration/deceleration operations by the rider. In the cruise control, at least a vehicle speed keeping control of keeping a vehicle speed to a setting speed is performed. Note that, the cruise control may also be an adaptive cruise control in which an inter-vehicle distance keeping control (i.e., a control of keeping an inter-vehicle distance between a host vehicle and a preceding vehicle to a setting distance) is performed in addition to the vehicle speed keeping control.

The control section 122 is configured to switch the traveling mode, in response to a rider's operation using an input device such as a push button switch provided to the motorcycle 10, for example. The control section 122 is also configured to control the acceleration/deceleration of the motorcycle 10, in response to the set traveling mode. Specifically, in a case where the traveling mode is set to the usual traveling mode, the control section 122 controls the acceleration/deceleration of the motorcycle 10, in response to the acceleration/deceleration operations by the rider. On the other hand, in a case where the traveling mode is set to the cruise control mode, the control section 122 executes the cruise control to automatically control the acceleration/deceleration of the motorcycle 10, irrespective of the acceleration/deceleration operations by the rider.

Note that, in the cruise control, a magnitude of the acceleration/deceleration of the motorcycle 10 is limited to an upper limit value or smaller that does not excessively impair comfortableness of the rider. When a specific operation (for example, a brake operation) is performed by the rider in a state where the traveling mode is set to the cruise control mode, the control section 122 may also switch the traveling mode to the usual traveling mode.

As described above, the control device 12 controls the operations of the motorcycle 10 (for example, the operation of the notification device 15 configured to issue a notification to the rider). Herein, in the control device 12, the acquisition section 121 acquires the prediction information about the future lane change by the preceding vehicle that travels ahead of the motorcycle 10, and the control section 122 causes the motorcycle 10 to execute a safety operation (for example, causes the notification device 15 to issue a warning of the lane change to the rider) when the prediction information satisfies a determination criterion during the slipping-through traveling of the motorcycle 10. Thereby, it is possible to appropriately assist the driving of the motorcycle 10 by the rider. The safety operation is an operation for avoiding a collision with other vehicles, and includes, for example, the warning of the lane change to the rider. In the below, processing about the warning of the lane change to the rider of processing that is executed by the control device 12 is described in detail.

<Operations of Control Device>

The operations of the control device 12 of the embodiment of the present invention are described with reference to FIGS. 3 and 4.

Figure 3:
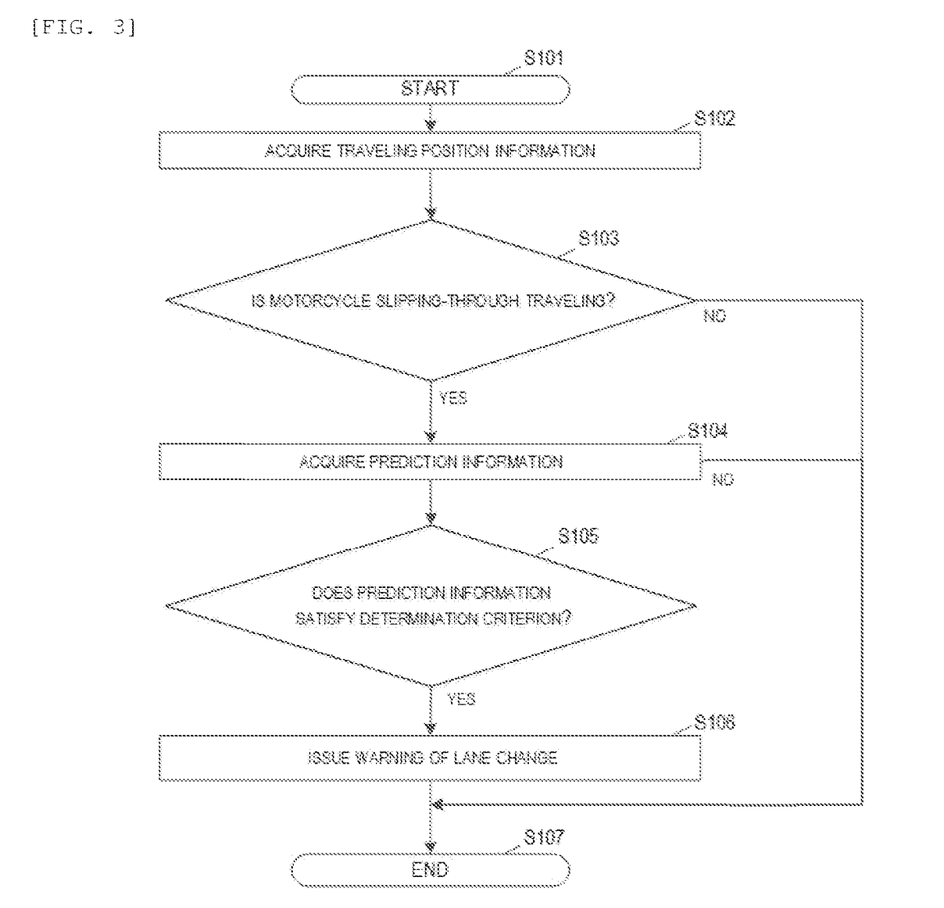
FIG. 3 is a flowchart depicting an example of a flow of processing that is executed by the control device in accordance with the embodiment of the present invention.

FIG. 3 is a flowchart depicting an example of a flow of processing that is executed by the control device 12. Specifically, the control flow shown in FIG. 3 is repeatedly executed. Step S101 and step S107 in FIG. 3 correspond to start and end of the control flow shown in FIG. 3. Note that, the control flow shown in FIG. 3 is executed, irrespective of the traveling mode.

Figure 4:
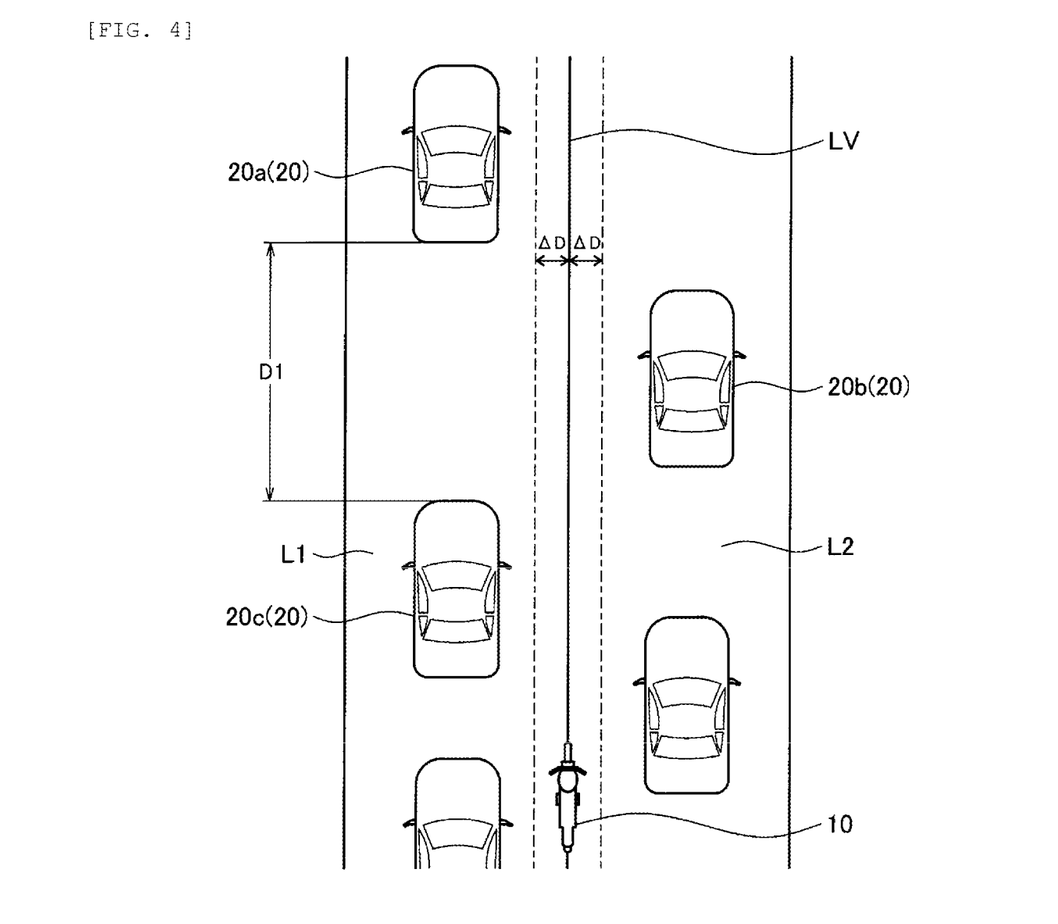
FIG. 4 is a pictorial view depicting an aspect where a motorcycle in accordance with the embodiment of the present invention is under slipping-through traveling.

FIG. 4 is a pictorial view depicting an aspect where the motorcycle 10 is under slipping-through traveling. Specifically, in the example shown in FIG. 4, the motorcycle 10 is traveling on a lane boundary LV of two adjacent lanes L1 and L2. Also, in FIG. 4, preceding vehicles 20*a*, 20*b* and 20*c* are shown as the preceding vehicle 20 of the motorcycle 10. The preceding vehicle 20*a* and the preceding vehicle 20*c* are traveling on the left lane L1 of the motorcycle 10, and the preceding vehicle 20*a* is positioned ahead of the preceding vehicle 20*c*. The preceding vehicle 20*b* is traveling on the right lane L2 of the motorcycle 10.

In the below, the control flow shown in FIG. 3 is described with reference to FIG. 4, as appropriate.

When the control flow shown in FIG. 3 starts, the acquisition section 121 acquires the traveling position information, in step S102. As described above, the traveling position information is information indicative of a traveling position of the motorcycle 10 in the width direction of the lane.

For example, the acquisition section 121 acquires, based on an output of the environment sensor 11, a distance between a lane boundary (specifically, a lane boundary closest to the motorcycle 10) and the motorcycle 10 in the width direction of the lane, as the traveling position information. The lane boundary means a boundary delimiting lanes. Note that, the acquisition section 121 may also acquire, as the traveling position information, another physical quantity that can be substantially converted into the distance between the lane boundary and the motorcycle 10 in the width direction of the lane.

Specifically, the environment sensor 11 recognizes the lane boundary and detects a relative position of the lane boundary with respect to the motorcycle 10 by performing image recognition processing on an image captured by the camera of the environment sensor 11. The acquisition section 121 can acquire the traveling position information, based on the information detected in this way.

Then, in step S103, the control section 122 determines whether the motorcycle 10 is under the slipping-through traveling. When it is determined that the motorcycle 10 is under the slipping-through traveling (step S103/YES), the control flow proceeds to step S104. On the other hand, when it is determined that the motorcycle 10 is not under the slipping-through traveling (step S103/NO), the control flow shown in FIG. 3 is over.

The determination processing of step S103 is performed based on the traveling position information, for example. For example, the control section 122 determines that the motorcycle 10 is under the slipping-through traveling when the distance between the lane boundary (specifically, the lane boundary closest to the motorcycle 10) and the motorcycle 10 in the width direction of the lane is shorter than a reference distance ΔD. The reference distance ΔD is set to a distance at which it can be determined that the motorcycle 10 is close to the lane boundary so that the motorcycle 10 can pass a side of the preceding vehicle 20. For example, as shown in FIG. 4, in a case where the motorcycle 10 is positioned in an area within the reference distance ΔD from the lane boundary LV in the width direction of the lane, the control section 122 determines that the motorcycle 10 is under the slipping-through traveling.

When YES is determined in step S103, the acquisition section 121 acquires the prediction information, in step S104. As described above, the prediction information is information about the future lane change by the preceding vehicle 20.

The prediction information may include a variety of information. For example, the prediction information includes at least one of positional relation information between a plurality of preceding vehicles 20, specification information of the preceding vehicles 20, winker information of the preceding vehicles 20, steering angle information of the preceding vehicles 20, motion information of occupants of the preceding vehicles 20, and vehicle traveling information on each of the lanes L1 and L2 on both sides of the motorcycle 10. Note that, the lanes L1 and L2 on both sides of the motorcycle 10 mean, specifically, the left lane L1 with respect to the lane boundary LV closest to the motorcycle 10 and the right lane L2 with respect to the lane boundary LV.

The positional relation information between the plurality of preceding vehicles 20 is information about the positional relation between the plurality of preceding vehicles 20, and may be, for example, information indicative of a positional relation between the plurality of preceding vehicles 20 in the width direction of the lane, information indicative of a positional relation between the plurality of preceding vehicles 20 in a length direction of the lane, or information indicative of a positional relation between the plurality of preceding vehicles 20 in the width direction of the lane and in the length direction. Note that, the acquisition section 121 may acquire, as the positional relation information, another information that can be substantially converted into the positional relation between the plurality of preceding vehicles 20.

The specification information of the preceding vehicle 20 is information about a specification of the preceding vehicle 20, and is, for example, information indicative of a vehicle type or a vehicle length, etc. of the preceding vehicle 20.

The winker information of the preceding vehicle 20 is information about a winker of the preceding vehicle 20, and is, for example, information indicative of an operating state (specifically, whether or not a blinking of a left winker is present and whether or not a blinking of a right winker is present) of the winker of the preceding vehicle 20.

The steering angle information of the preceding vehicle 20 is information about a rudder angle of the preceding vehicle 20, and is, for example, information indicative of a rudder angle of the preceding vehicle 20 (specifically, a steering angle of a steering wheel or a tire rudder angle). Note that, the acquisition section 121 may also acquire another physical quantity that can be substantially converted into the rudder angle of the preceding vehicle 20, as the steering angle information.

The motion information of the occupant of the preceding vehicle 20 is information about a motion of the occupant of the preceding vehicle 20, and is, for example, information indicating what motion the occupant of the preceding vehicle 20 is performing.

The vehicle traveling information on each of the lanes L1 and L2 on both sides of the motorcycle 10 is information about traveling of vehicles on each of the lanes L1 and L2, and may also be, for example, density information of vehicles on each lane of the lanes L1 and L2 or vehicle speed information of vehicles on each lane of the lanes L1 and L2. The density information is information about a density of vehicles on each lane, and is, for example, information indicative of the number of vehicles per unit distance on each lane of the lanes L1 and L2. Note that, the acquisition section 121 may also acquire another physical quantity that can be substantially converted into the density of vehicles on each lane, as the density information. The vehicle speed information is information about vehicle speeds of vehicles on each lane of the lanes L1 and L2, and is, for example, information indicative of an average value of vehicle speeds on each lane. Note that, the acquisition section 121 may also acquire another physical quantity that can be substantially converted into the vehicle speed on each lane, as the vehicle speed information.

As a method of acquiring the prediction information including the variety of information exemplified above, diverse methods can be used.

Specifically, the prediction information may also be acquired based on the output of the environment sensor 11 mounted to the motorcycle 10. For example, the positional relation information between the plurality of preceding vehicles 20 can be acquired based on the relative positon of each of the preceding vehicles 20 with respect to the motorcycle 10, which is detected by the radar of the environment sensor 11. Also, the specification information, the winker information, the steering angle information and the motion information of the occupant of the preceding vehicle 20 can be acquired by performing the image recognition processing on an image captured by the camera of the environment sensor 11. Also, the density information on each lane of the lanes L1 and L2 can be acquired by specifying the number of the preceding vehicles 20 by performing the image recognition processing on an image captured by the camera of the environment sensor 11, and based on a distance assumed as a distance in the length direction of the lane captured in the image and the specified number of the preceding vehicles 20. Also, the vehicle speed information on each lane of the lanes L1 and L2 can be acquired by specifying a relative speed of each of the preceding vehicles 20, based on a change in relative position of each of the preceding vehicles 20 with respect to the motorcycle 10, which is detected by the environment sensor 11.

The prediction information may also be acquired by wireless communication between the motorcycle 10 and other vehicles or infrastructure equipment. For example, the positional relation information between the plurality of preceding vehicles 20 may be acquired based on information transmitted to the motorcycle 10 from each of the preceding vehicles 20, or information transmitted to the motorcycle 10 from roadside devices equipped in the vicinity of the lanes L1 and L2 and configured to detect positions of vehicles traveling on each lane. The specification information, the winker information, the steering angle information and the motion information of the occupant of the preceding vehicle 20 may also be acquired based on information transmitted to the motorcycle 10 from the corresponding preceding vehicle 20. The density information and the vehicle speed information on each lane of the lanes L1 and L2 may also be acquired based on information transmitted to the motorcycle 10 from the roadside devices equipped in the vicinity of the lanes L1 and L2 and configured to detect the corresponding information.

Subsequently, in step S105, the control section 122 determines whether the prediction information satisfies a determination criterion. When it is determined that the prediction information satisfies the determination criterion (step S105/YES), the control flow proceeds to step S106 where a warning of the lane change is issued to the rider, as described later. On the other hand, when it is determined that the prediction information does not satisfy the determination criterion (step S105/NO), the control flow shown in FIG. 3 is over.

A case where the prediction information satisfies the determination criterion corresponds to a case where the future lane change by the preceding vehicle 20 is predicted. That is, the determination processing of step S105 corresponds to the determination processing of determining whether the future lane change by the preceding vehicle 20 is predicted.

The determination processing of step S105 is performed based on a determination criterion corresponding to a type of the prediction information. In the below, a case where the determination processing of step S105 is performed by using the positional relation information between the plurality of preceding vehicles 20 as the prediction information is described with reference to FIG. 4.

In the example shown in FIG. 4, the determination criterion in step S105 includes, for example, a condition that an inter-vehicle distance D1 between the preceding vehicle 20a and the preceding vehicle 20c traveling on the lane L1 (specifically, a distance between a rear end of the preceding vehicle 20a and a front end of the preceding vehicle 20c) is greater than a threshold value and the preceding vehicle 20b traveling on the lane L2 is positioned between the preceding vehicle 20a and the preceding vehicle 20c in the length direction of the lane. The threshold value is set to a value at which it can be determined that the preceding vehicle 20a and the preceding vehicle 20c are sufficiently apart each other so that the preceding vehicle 20b can change lanes toward a position between the preceding vehicle 20a and the preceding vehicle 20c. Therefore, when the inter-vehicle distance D1 is greater than the threshold value and the preceding vehicle 20b is positioned between the preceding vehicle 20a and the preceding vehicle 20c in the length direction of the lane, the control section 122 determines that the positional relation information as the prediction information satisfies the determination criterion.

In a case where the determination processing of step S105 is performed using the positional relation information between the plurality of preceding vehicles 20 as the prediction information, the specification information of the preceding vehicle 20 may also be additionally used as the prediction information. For example, in the example shown in FIG. 4, the control section 122 may increase the threshold value, which is compared to the inter-vehicle distance D1, as a vehicle length of the preceding vehicle 20b is longer. Also, for example, when the preceding vehicle 20b is a large vehicle, the control section 122 may increase the threshold value, which is compared to the inter-vehicle distance D1, as compared to a case where the preceding vehicle 20b is a small vehicle. Herein, the inter-vehicle distance D1 necessary for the preceding vehicle 20b to change lanes toward a position between the preceding vehicle 20a and the preceding vehicle 20c increases as the vehicle length of the preceding vehicle 20b is longer and also increases as the preceding vehicle 20b is larger. Therefore, it is possible to optimize the determination processing of step S105 by adjusting the threshold value, according to the specification information of the preceding vehicle 20b, as described above. Note that, the control section 122 may also change the threshold value, based on the information (for example, the vehicle speed of the preceding vehicle 20b) other than the specification information. For example, the control section 122 may increase the threshold value as the vehicle speed of the preceding vehicle 20b increases.

As described above, the prediction information that is used in the determination processing of step S105 may include a variety of information. In the above, the case where the determination processing of step S105 is performed using the positional relation information between the plurality of preceding vehicles 20 as the prediction information has been described. However, the determination processing of step S105 may also be performed using the other prediction information.

In a case where the determination processing of step S105 is performed using the winker information of the preceding vehicle 20 as the prediction information, the determination criterion in step S105 includes, for example, a condition that there is a preceding vehicle 20 whose winker is operating in a state corresponding to the lane change across the lane boundary LV. In particular, the condition includes a condition that there is a preceding vehicle 20 whose winker is operating in a state corresponding to the lane change across the lane boundary LV although the lane change does not actually start. For example, in the example shown in FIG. 4, when only the left winker of the winkers of the preceding vehicle 20b positioned on the right side of the motorcycle 10 is blinking, the control section 122 determines that the winker information as the prediction information satisfies the determination criterion.

In a case where the determination processing of step S105 is performed using the steering angle information of the preceding vehicle 20 as the prediction information, the determination criterion in step S105 includes, for example, a condition that there is a preceding vehicle 20 having a rudder angle of a direction and a magnitude at which the lane change across the lane boundary LV is predicted. In particular, the condition includes a condition that there is a preceding vehicle 20 having a rudder angle of a direction and a magnitude at which the lane change across the lane boundary LV is predicted although the lane change does not actually start. For example, in the example shown in FIG. 4, when the rudder angle of the preceding vehicle 20*b* positioned on the right side of the motorcycle 10 is tilted in a direction of turning left the preceding vehicle 20*b* and a magnitude of the rudder angle is large enough to predict the lane change across the lane boundary LV, the control section 122 determines that the steering angle information as the prediction information satisfies the determination criterion.

In a case where the determination processing of step S105 is performed using the motion information of the occupant of the preceding vehicle 20 as the prediction information, the determination criterion in step S105 includes, for example, a condition that there is a preceding vehicle 20 in which an occupant who performs a motion suggesting the lane change across the lane boundary LV is present. In particular, the condition includes a condition that there is a preceding vehicle 20 in which an occupant who performs a motion suggesting the lane change across the lane boundary LV is present although the lane change does not actually start. For example, in the example shown in FIG. 4, when the occupant in the preceding vehicle 20*b* positioned on the right side of the motorcycle 10 opens a left window and gives a signal indicative of a lane change with a hand, the control section 122 determines that the motion information of the occupant as the prediction information satisfies the determination criterion.

In a case where the determination processing of step S105 is performed using the density information of the vehicles on each lane of the lanes L1 and L2 as the prediction information, the determination criterion in step S105 includes, for example, a condition that a difference between a density of vehicles on the lane L1 and a density of vehicles on the lane L2 is larger than a reference density difference. The reference density difference is set to a value at which it can be determined that a lane change from a lane on which the density is high to a lane on which the density is low is predicted, for example.

In a case where the determination processing of step S105 is performed using the speed information of the vehicles on each lane of the lanes L1 and L2 as the prediction information, the determination criterion in step S105 includes, for example, a condition that a difference between a vehicle speed on the lane L1 and a vehicle speed on the lane L2 is larger than a reference speed difference. The reference speed difference is set to a value at which it can be determined that a lane change from a lane on which the speed is slow to a lane on which the speed is fast is predicted, for example.

Herein, the control section 122 preferably changes the determination criterion, according to the traveling mode of the motorcycle 10. Specifically, in a case where the traveling mode is the cruise control mode, the control section 122 preferably changes the determination criterion so that it is more likely to determine YES in step S105 (i.e., it is easier to issue a warning of the lane change to the rider), as compared to a case where the traveling mode is the usual traveling mode. For example, in the example shown in FIG. 4, in the case where the traveling mode is the cruise control mode, the control section 122 may decrease the threshold value that is compared to the inter-vehicle distance D1 in the determination processing of step S105, as compared to the case where the traveling mode is the usual traveling mode.

During the cruise control mode, since the rider's attention to the front is more likely to decrease, as compared to the usual traveling mode. Therefore, by facilitating the warning of the lane change to the rider, it is possible to assist more appropriately the driving of the motorcycle 10 by the rider.

When YES is determined in step S105, in step S106, the control section 122 causes the notification device 15 to issue the warning of the lane change to the rider, and the control flow shown in FIG. 3 is over.

For example, the control section 122 causes the notification device 15 to output a sound enabling the rider to recognize the warning of the lane change. Herein, a sound volume of the sound that is generated by the notification device 15 in the warning of the lane change is preferably such that the rider is not overly surprised. Also, for example, the control section 122 may cause the notification device 15 to perform a display enabling the rider to recognize the warning of the lane change.

Herein, the control section 122 preferably changes the warning aspect of the lane change to the rider, based on the prediction information. Thereby, it is possible to change the warning aspect of the lane change, according to a degree of possibility of the future lane change by the preceding vehicle 20.

The control section 122 may also change the warning aspect of the lane change to the rider, according to the type of the prediction information, for example. For example, in a case where the winker information of the preceding vehicle 20 is used in step S105, it is assumed that the possibility of the future lane change by the preceding vehicle 20 is higher, as compare to a case where the positional relation information between the plurality of preceding vehicles 20 is used in step S105. Therefore, in the case where the winker information of the preceding vehicle 20 is used in step S105, the control section 122 may increase a sound volume in the warning by the sound output, prolong a period for which the sound in the warning by the sound output is generated or change an illuminance or a display color in the warning by the display, as compared to the case where the positional relation information between the plurality of preceding vehicles 20 is used in step S105.

The control section 122 may also change the warning aspect of the lane change to the rider, according to the degree of possibility of the lane change in the prediction information, for example. Specifically, when YES is determined in step S105, the control section 122 may predict a degree of possibility of the lane change, based on the prediction information, and change the warning aspect of the lane change to the rider, according to the degree of possibility of the lane change. For example, in a case where the positional relation information between the plurality of preceding vehicles 20 is used in step S105, the control section 122 may predict a high degree as the degree of possibility of the lane change as the inter-vehicle distance D1 is longer, and may increase a sound volume in the warning by the sound output or prolong a period for which the sound in the warning by the sound output is generated, as the predicted degree of possibility of the lane change is higher. The control section 122 may also change an illuminance or a display color in the warning by the display, according to the predicted degree of possibility of the lane change.

In the above, the example where it is determined whether the motorcycle 10 is under the slipping-through traveling, based on the traveling position information. However, the control section 122 may perform the determination by other methods. For example, the control section 122 may determine whether the motorcycle 10 is under the slipping-through traveling, in response to a rider's operation using an input device such as a button or a switch provided to the motorcycle 10. When the lane boundary LV is not recognized by the environment sensor 11, the control section 122 may also determine whether the motorcycle 10 is under the slipping-through traveling, based on the positional relation between the motorcycle 10 and the surrounding vehicle. For example, in a case where the motorcycle 10 is traveling between two vehicles that are traveling side by side in the same direction, the control section 122 may determine that the motorcycle 10 is under the slipping-through traveling. Note that, the positional relation between the motorcycle 10 and the surrounding vehicle may be acquired, based on the output of the environment sensor 11.

<Effects of Control Device>

The effects of the control device 12 of the embodiment of the present invention are described.

In the control device 12, the acquisition section 121 acquires the prediction information about the future lane change by the preceding vehicle 20 that travels ahead of the motorcycle 10. When the prediction information satisfies the determination criterion during the slipping-through traveling of the motorcycle 10, the control section 122 causes the notification device 15 to issue the warning of the lane change to the rider. Thereby, as compared to a case where the warning of the lane change to the rider is performed, in response to occurrence of a behavior of the preceding vehicle 20 coming close to a pathway of the motorcycle 10, it is possible to cause the notification device 15 to perform the warning at an earlier timing. Therefore, it is possible to appropriately assist the driving of the motorcycle 10 by the rider.

Preferably, in the control device 12, the control section 122 changes the warning aspect of the lane change to the rider, according to the type of the prediction information. Herein, the degree of possibility of the future lane change by the preceding vehicle 20 may be different according to the type of the prediction information that satisfies the determination criterion. Therefore, by changing the aspect of the warning according to the type of the prediction information, it is possible to change the warning aspect of the lane change according to the degree of possibility of the future lane change by the preceding vehicle 20. Therefore, it is possible to cause the rider to recognize the degree of possibility of the future lane change by the preceding vehicle 20.

Preferably, in the control device 12, the control section 122 changes the warning aspect of the lane change to the rider, according to the degree of possibility of the lane change in the prediction information. Thereby, even when the type of the prediction information is the same, it is possible to change the warning aspect of the lane change, according to the degree of possibility of the future lane change by the preceding vehicle 20. Therefore, it is possible to cause the rider to recognize the degree of possibility of the future lane change by the preceding vehicle 20.

Preferably, in the control device 12, the control section 122 changes the determination criterion, according to the traveling mode of the motorcycle 10. As described above, the rider's attention to the front may change according to the set traveling mode. Therefore, by changing the determination criterion according to the traveling mode, it is possible to appropriately change the easiness with which the warning of the lane change is performed, according to the change in rider's attention to the front. Therefore, it is possible to assist more appropriately the driving of the motorcycle 10 by the rider.

Preferably, in the control device 12, the prediction information includes the positional relation information between the plurality of preceding vehicles 20. Thereby, it is possible to predict the future lane change by the preceding vehicle 20 with accuracy, according to the positional relation information between the plurality of preceding vehicles 20. Therefore, when the lane change is performed in the future by the preceding vehicle 20, it is possible to appropriately cause the notification device 15 to issue the warning of the lane change to the rider.

Preferably, in the control device 12, the prediction information includes the specification information of the preceding vehicle 20. Thereby, it is possible to predict the future lane change by the preceding vehicle 20 with accuracy, according to the specification information of the preceding vehicle 20. Therefore, when the lane change is performed in the future by the preceding vehicle 20, it is possible to appropriately cause the notification device 15 to issue the warning of the lane change to the rider.

Preferably, in the control device 12, the prediction information includes the winker information of the preceding vehicle 20. Thereby, it is possible to predict the future lane change by the preceding vehicle 20 with accuracy, according to the winker information of the preceding vehicle 20. Therefore, when the lane change is performed in the future by the preceding vehicle 20, it is possible to appropriately cause the notification device 15 to issue the warning of the lane change to the rider.

Preferably, in the control device 12, the prediction information includes the steering angle information of the preceding vehicle 20. Thereby, it is possible to predict the future lane change by the preceding vehicle 20 with accuracy, according to the steering angle information of the preceding vehicle 20. Therefore, when the lane change is performed in the future by the preceding vehicle 20, it is possible to appropriately cause the notification device 15 to issue the warning of the lane change to the rider.

Preferably, in the control device 12, the prediction information includes the motion information of the occupant of the preceding vehicle 20. Thereby, it is possible to predict the future lane change by the preceding vehicle 20 with accuracy, according to the motion information of the occupant of the preceding vehicle 20. Therefore, when the lane change is performed in the future by the preceding vehicle 20, it is possible to appropriately cause the notification device 15 to issue the warning of the lane change to the rider.

Preferably, in the control device 12, the prediction information includes the vehicle traveling information on each of the lanes L1 and L2 on both sides of the motorcycle 10 (for example, the density information or vehicle speed information of vehicles on each lane). Thereby, it is possible to predict the future lane change by the preceding vehicle 20 with accuracy, according to the vehicle traveling information on each lane of the lanes L1 and L2. Therefore, when the lane change is performed in the future by the preceding vehicle 20, it is possible to appropriately cause the notification device 15 to issue the warning of the lane change to the rider.

Preferably, in the control device 12, the prediction information is acquired based on the output of the environment sensor 11 mounted to the motorcycle 10. Thereby, as compared to a case where the prediction information is acquired by wireless communication between the motorcycle and the other vehicles or the infrastructure equipment, it is possible to shorten communication delay in the acquisition processing of the prediction information. Therefore, it is possible to cause the notification device 15 to issue the warning of the lane change to the rider at an earlier timing. Therefore, it is possible to appropriately assist the driving of the motorcycle 10 by the rider.

Preferably, in the control device 12, the prediction information is acquired by wireless communication between the motorcycle 10 and the other vehicles or the infrastructure equipment. Herein, the range that can be detected by the environment sensor 11 may be limited to some range of the surrounding environment of the motorcycle 10. For example, when an obstacle (for example, another preceding vehicle 20) is positioned between the motorcycle 10 and the preceding vehicle 20 that is a detection target, it may be difficult to appropriately detect the information about the preceding vehicle 20 that is a detection target. Therefore, by acquiring the prediction information by wireless communication between the motorcycle 10 and the other vehicles or the infrastructure equipment, it is possible to acquire more information as the prediction information, as compared to a case where the prediction information is acquired based on the output of the environment sensor 11. Therefore, it is possible to predict the future lane change by the preceding vehicle 20 with accuracy. Therefore, when the lane change is performed in the future by the preceding vehicle 20, it is possible to appropriately cause the notification device 15 to issue the warning of the lane change to the rider.

The present invention is not limited to the descriptions of the embodiment. For example, only some of the embodiment may be implemented. Also, the safety operation that is executed by the motorcycle 10 when the prediction information satisfies the determination criterion is not limited to the warning of the lane change to the rider mainly described in the above, and may also include, for example, an operation of braking the motorcycle 10 by reducing the setting speed of the cruise control mode during the execution of the cruise control mode, a pre-brake operation of automatically generating a relatively small braking force for the motorcycle 10, and the like. Also, in addition to or instead of the warning of the lane change to the rider mainly described in the above, an operation of causing a driver of the surrounding vehicle to recognize the host vehicle (for example, a passing operation using a headlight of the motorcycle 10) may also be executed.

REFERENCE SIGNS LIST

10: Motorcycle
11: Environment sensor
12: Control device
13: Engine
14: Hydraulic pressure control unit
15: Notification device
20, 20a, 20b, 20c: Preceding vehicle
121: Acquisition section
122: Control section
122a: Drive control section
122b: Braking control section
122c: Notification control section
D1: Inter-vehicle distance
L1: Lane
L2: Lane
LV: Lane boundary

The invention claimed is:

1. An electronic control device (12) configured to control an operation of a notification device (15) configured to issue a warning to a rider of a straddle-type vehicle (10), the electronic control device (12) configured to:

acquire prediction information about a future lane change by a preceding vehicle (20) that travels ahead of the straddle-type vehicle (10); and when the prediction information satisfies a determination criterion during a slipping-through traveling on or near a lane boundary delimiting lanes of the straddle-type vehicle (10), causes the straddle-type vehicle (10) to execute a safety operation, wherein the electronic control device (12) is further configured to change an aspect of the safety operation according to a degree of possibility of the lane change in the prediction information during the slipping-through traveling of the straddle-type vehicle (10).

2. The electronic control device according to claim 1, wherein the electronic control device (12) is configured to change an aspect of the safety operation, according to a type of the prediction information.

3. The electronic control device according to claim 1, wherein the electronic control device (12) is configured to change the determination criterion, according to a whether the straddle-type vehicle (10) is operating in a usual travel mode or a cruise control mode.

4. The electronic control device according to claim 1, wherein the prediction information comprises positional relation information between a plurality of the preceding vehicles (20).

5. The electronic control device according to claim 4, wherein the prediction information comprises specification information of the preceding vehicles (20).

6. The electronic control device according to claim 1, wherein the prediction information comprises winker information of the preceding vehicle (20).

7. The electronic control device according to claim 1, wherein the prediction information comprises steering angle information of the preceding vehicle (20).

8. The electronic control device according to claim 1, wherein the prediction information comprises motion information of an occupant of the preceding vehicle (20).

9. The electronic control device according to claim 1, wherein the prediction information comprises vehicle traveling information on each of lanes (L1, L2) on both sides of the straddle-type vehicle (10) while the straddle-type vehicle is travelling on the or near the lane boundary.

10. The electronic control device according to claim 1, wherein the prediction information is acquired based on an output of an environment sensor (11) mounted to the straddle-type vehicle (10).

11. The electronic control device according to claim 1, wherein the prediction information is acquired by wireless communication between the straddle-type vehicle (10) and other vehicles or infrastructure equipment.

12. A control method of a straddle-type vehicle (10), the method comprising:

acquiring prediction information about a future lane change by a preceding vehicle (20) that travels ahead of the straddle-type vehicle (10), and causing the straddle-type vehicle (10) to execute a safety operation when the prediction information satisfies a determination criterion during a slipping-through traveling of the straddle-type vehicle (10), wherein the method further includes changing an aspect of the safety operation according to a degree of possibility of the lane change in the prediction information during the slipping-through traveling of the straddle-type vehicle (10).

* * * * *